United States Patent
Oohara

(10) Patent No.: US 6,738,224 B2
(45) Date of Patent: May 18, 2004

(54) MAGNETIC TAPE GUIDE HAVING A GUIDE SURFACE FORMED BY A PLURALITY OF CIRCULAR ARC SURFACES AND A MAGNETIC TAPE DEVICE INCLUDING SAME

(75) Inventor: Tsuneyoshi Oohara, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 180 days.

(21) Appl. No.: 09/822,626

(22) Filed: Mar. 30, 2001

(65) Prior Publication Data

US 2002/0057529 A1 May 16, 2002

(30) Foreign Application Priority Data

Nov. 10, 2000 (JP) ........................................ 2000-343187

(51) Int. Cl.⁷ ............................................... G11B 15/60
(52) U.S. Cl. ................................................. 360/130.21
(58) Field of Search ................. 360/130.21; 242/332.4, 242/332.7, 532.7

(56) References Cited

U.S. PATENT DOCUMENTS 6,067,211 A  *  5/2000  Chliwnyj et al. ............ 360/128
6,257,514 B1 *  7/2001  Morris et al. ............. 242/332.1
6,330,983 B1 * 12/2001  Augustin ................. 242/332.4

FOREIGN PATENT DOCUMENTS

| JP | 9-511352 | 11/1997 |
| JP | 10-011847 | 1/1998 |
| WO | WO 95/177000 | * 6/1995 |

* cited by examiner

Primary Examiner—David Davis
(74) Attorney, Agent, or Firm—Greer, Burns & Crain, Ltd.

(57) ABSTRACT

In a case in which hydrobearings are used in the tape guides of a magnetic tape device, the guide surface for guiding a magnetic tape is formed by a plurality of circular arc surfaces. In accordance therewith, the contact surface area of a magnetic tape and tape guide becomes smaller, making it possible to prevent the sticking of a magnetic tape to tape guide.

6 Claims, 5 Drawing Sheets

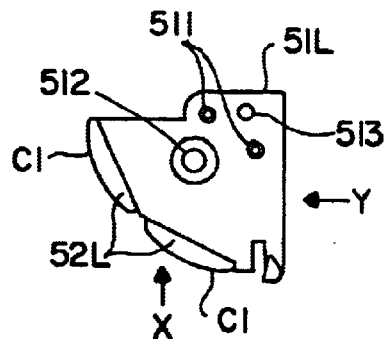
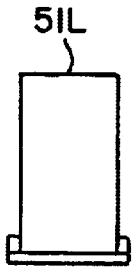
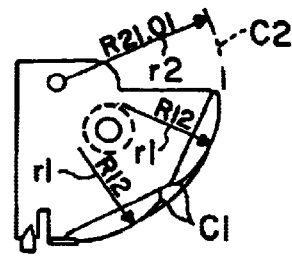
FIG.4A   FIG.4C   FIG.4D
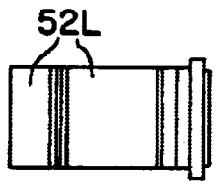
FIG.4B
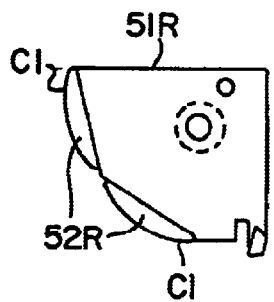
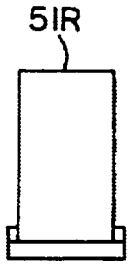
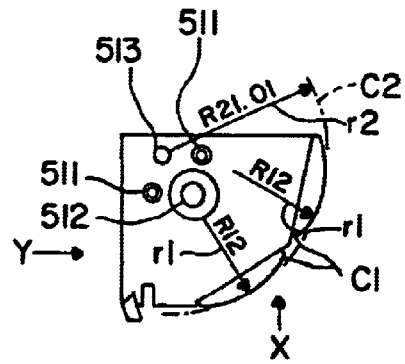
FIG.5D   FIG.5C   FIG.5A
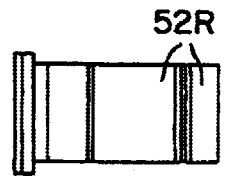
FIG.5B

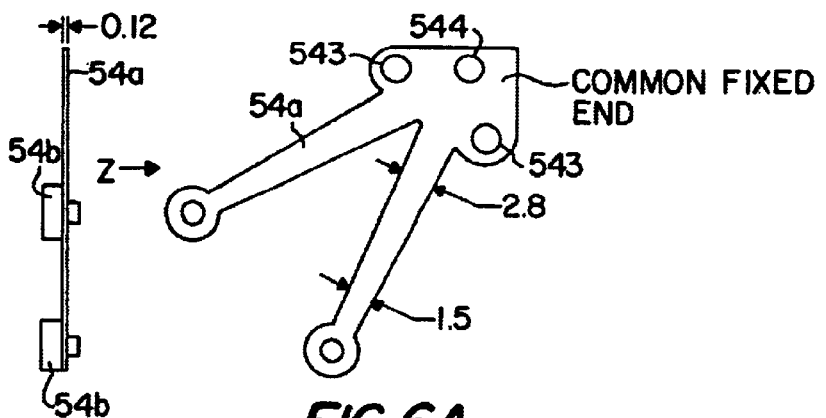
FIG. 6A
FIG. 6B
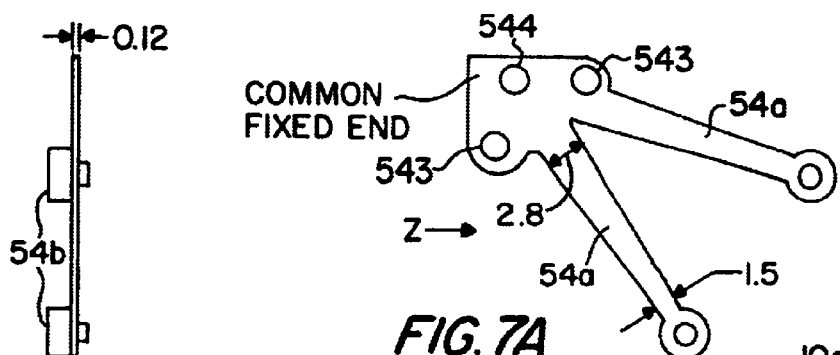
FIG. 7A
FIG. 7B
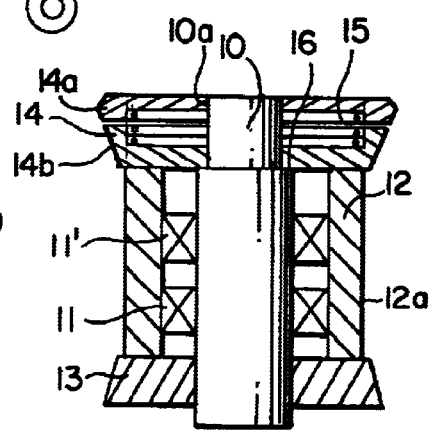
FIG. 9
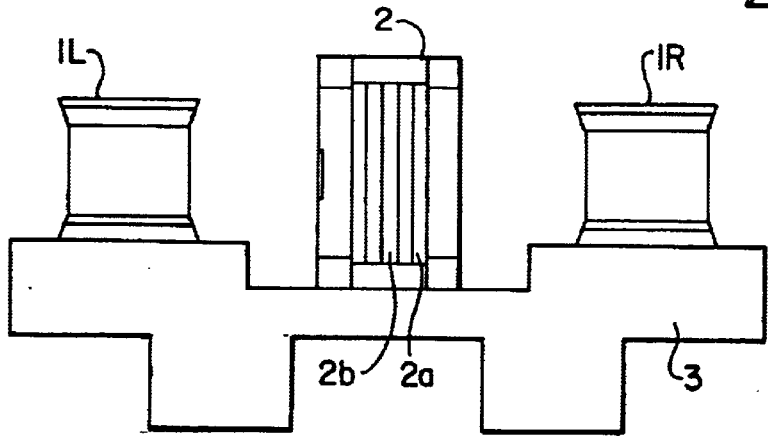
FIG. 8

MAGNETIC TAPE GUIDE HAVING A GUIDE SURFACE FORMED BY A PLURALITY OF CIRCULAR ARC SURFACES AND A MAGNETIC TAPE DEVICE INCLUDING SAME

BACKGROUND OF THE INVENTION

1. Field of the Invention

The present invention relates to a magnetic tape device, and more particularly to a magnetic tape device comprising a tape guide, which is suitable for the high-speed travel of a magnetic tape.

2. Description of the Related Art

A magnetic tape device utilizes a magnetic tape, which is a tape-shaped magnetic recording medium, makes the magnetic tape travel while being guided by rotating tape guides (roller guides), and reads/writes data by using a magnetic head in relation to the magnetic tape thereof.

A magnetic tape is guided within a tape travel path by a plurality of tape guides. This magnetic tape is housed in a tape cartridge. The magnetic tape is wound around a file reel disposed inside the cartridge. The cartridge is introduced into the inside of a magnetic tape device by a loader. The magnetic tape housed inside the cartridge is attached to a machine reel by having the end thereof guided by a threader. The machine reel takes up the magnetic tape wound around the file reel.

FIG. 8 is a block diagram showing one example of the placement of tape guides and a magnetic head, which constitute a magnetic tape device. In FIG. 8, tape guides 1L, 1R are lined up in the direction of travel of the magnetic tape and positioned on a base 3. A magnetic head 2 is affixed on the base 3 between tape guides 1L and 1R. Magnetic head 2 can perform data read/write by arbitrarily selecting any one of a plurality of tracks (for example, 24). That is, there is provided a plurality of playback head portions 2a and recording head portions 2b for each track.

FIG. 9 is a cross-sectional view showing one example of a conventional tape guide. In FIG. 9, a tape guide 1 comprises a fixed shaft 10. This fixed shaft 10 is affixed to a base 3. Two bearings 11, 11' support a rotating shaft 12 rotatably around fixed shaft 10. This rotating shaft 12 is a so-called cylindrical roller. The peripheral surface 12a of this roller 12 is a guide surface for guiding a magnetic tape. Peripheral surface 12a of roller 12 guides a magnetic tape in a state in which same makes contact with the recording surface of the magnetic tape. Roller 12 rotates in accordance with the frictional force between the magnetic tape and roller 12 when the magnetic tape travels. The rotational speed of peripheral surface 12a of roller 12 becomes the same as the travel speed of the magnetic tape. A lower flange 13 is affixed to the bottom side of fixed shaft 10. An upper flange 14 is disposed on the top side of fixed shaft 10. Upper flange 14 comprises a movable portion 14b, a fixed portion 14a and a coil spring 15. Fixed portion 14a is affixed to a small diameter portion 10a of fixed shaft 10. Movable portion 14b is fitted onto the small diameter portion 10a so as to be capable of moving up and down along the small diameter portion 10a. Coil spring 15 biases movable portion 14b toward a step portion 16 of fixed shaft 10. The force by which coil spring 15 biases movable portion 14b constitutes a force for biasing a magnetic tape to lower flange 13. Movable portion 14b is capable of moving up and down along the small diameter portion 10a of fixed shaft 10. Movable portion 14b, under the biasing force of coil spring 15, is hit against step portion 16 of fixed shaft 10. Applying suitable biasing force in accordance with coil spring 15 enables a magnetic tape to be made to travel along lower flange 13. Because a magnetic tape will not be biased to lower flange 13 if the biasing force is too weak, a magnetic tape will slip out of position in the up-down direction of the roller guide during tape travel. Slippage causes uneven winding on the take-up reel, and becomes a cause of the edges of a magnetic tape folding. Further, if the biasing force is too strong, there is the danger of the edges of a magnetic tape being either folded or scraped, and of a magnetic tape being destroyed.

In a magnetic tape device of this kind, in order for magnetic tape read/write processing to be carried out faster, it is necessary for a magnetic tape to be made to travel at higher speed.

However, the problem is that a conventional tape guide (roller guide) has low endurance to highspeed rotation, and the life of a conventional tape guide decreases when it is rotated at high speed.

Meanwhile, a hydrobearing guide is well-known as a tape guide for use in place of a roller guide, which rotates in accordance with the travel of a magnetic tape. A hydrobearing guide is constituted from, for example, a ceramic, and because it does not rotate in accordance with magnetic tape travel, has high durability. The peripheral surface of a hydrobearing guide has a circular arc surface for guiding a magnetic tape along the tape travel path, and it is known that when a magnetic tape is made to travel at high speed, the magnetic tape travels by levitating without coming into contact with the circular arc surface. The following expression is known as an expression for approximating the degree of levitation of a magnetic tape.

Degree of levitation expression $$h = 0.643r(6\mu V/T)^{2/3}$$

h: degree of levitation, r: radius of curvature of guide, $\mu$: viscosity of air, V: tape travel velocity, T: tape tension By making a magnetic tape travel by levitating in relation to a tape guide, the magnetic tape does not come in contact with the circular arc surface, thus enabling the prevention of magnetic tape friction during highspeed travel. Based on the above expression, the larger the circular arc radius of the circular arc surface (the radius of curvature r of the above-mentioned expression) at this time, the greater the degree of levitation of a magnetic tape in relation to the circular arc surface. Therefore, to ensure the required degree of levitation, it is necessary that the circular arc that forms the tape travel path be set to a predetermined radius.

However, when a magnetic tape is being wound onto the take-up reel, or in the interval until a stopped magnetic tape achieves highspeed travel, and furthermore, in the interval until a magnetic tape travelling at high speed is stopped, the magnetic tape travels by making contact with the circular arc surface (According to the above-mentioned expression, the degree of levitation is proportional to the tape travel speed, and when the tape travel speed is slow, a magnetic tape is not levitated.) To curb as much as possible the friction of a magnetic tape resulting from the magnetic tape traveling by making contact with the circular arc surface, it is necessary to improve as much as possible the relative surface roughness of the circular arc surface of a hydrobearing guide.

However, the problem is that, when the relative surface roughness of the circular arc surface is improved, when a magnetic tape comes in contact with the circular arc surface, the magnetic tape sticks to the circular arc surface. When an attempt is made to make a magnetic tape travel after the magnetic tape has been stuck to the circular arc surface one time, the magnetic tape either breaks or stretches, causing the magnetic tape to be damaged.

The sticking of a magnetic tape tends to occur more readily the larger the contact surface area of the magnetic tape and circular arc surface. To make the contact surface area smaller, it is necessary to make the circular arc radius of the circular arc surface smaller, but by so doing, as explained hereinabove, it becomes impossible to make a magnetic tape travel so that it levitates at a sufficient degree of levitation.

SUMMARY OF THE INVENTION

Therefore, an object of the present invention is to provide a magnetic tape device, which is capable of making a magnetic tape travel stably without being stuck to a hydrobearing guide.

A magnetic tape device of the present invention comprises a magnetic head for performing read/write operation to a magnetic tape traveling a tape travel path, and tape guides, each of which has a guide surface for guiding the magnetic tape along the tape travel path, and which are positioned respectively on the upstream side and downstream side of the magnetic head, wherein the guide surface of the tape guide is formed by a plurality of circular arc surfaces.

For example, the tape guide may have a flange for forming a reference travel position for one edge in the width direction of the magnetic tape, and a flat spring for biasing the other edge of the magnetic tape to the travel reference position.

Further, the flat spring has an elongated portion having a prescribed length, and a protruding portion which is formed on the end that is opposite to the fixed end of the elongated portion, and the protruding portion comes in contact with the magnetic tape. The elongated portion may have a tapering shape toward from the fixed end to the opposite end. The flat spring is preferably provided in the same number as the plurality of circular arc surfaces, and each flat spring biases the magnetic tape on each circular arc surface.

BRIEF DESCRIPTION OF THE DRAWINGS

FIGS. 4A, 4B, 4C and 4D are a top view, front view, side view and bottom view of block 51L and hydrobearing 52L bonded thereto respectively;

FIGS. 5A, 5B, 5C and 5D are a top view, front view, side view and bottom view of block 51R and hydrobearing 52R bonded thereto respectively;

FIGS. 6A and 6B are a top view and side view of flat spring 54L respectively;

FIGS. 7A and 7B are a top view and side view of flat spring 54R respectively;

FIG. 8 is a block diagram showing one example of the placement of tape guides and a magnetic head, which constitute a magnetic tape device; and FIG. 9 is a cross-sectional view showing one example of a conventional tape guide.

DESCRIPTION OF THE PREFERRED EMBODIMENTS

Aspects of the embodiment of the present invention will be explained hereinbelow. However, the technical scope of the present invention is not limited to these aspects of the embodiment.

Figure 1:
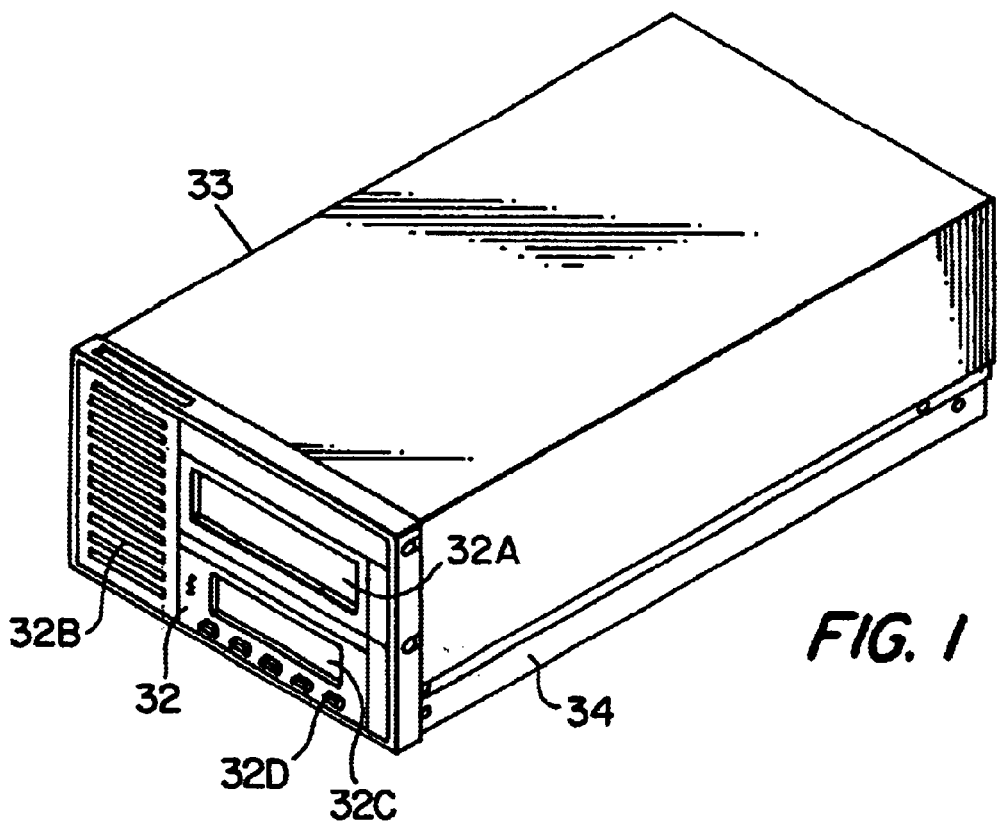
FIG. 1 is a perspective view showing an example of the external constitution of a magnetic tape device in an aspect of the embodiment of the present invention.

FIG. 1 is a perspective view showing an example of the external constitution of a magnetic tape device in an aspect of the embodiment of the present invention. In FIG. 1, a magnetic tape device is covered by a front panel 32, a top cover (top plate and side plate) 33, bottom plate 34 and back plate 35. On the front panel 32, there are disposed a cartridge insertion slot 32A, a grid-shaped aperture portion for cooling 32B, a display portion 32C, and an operating portion 32D.

Figure 2:
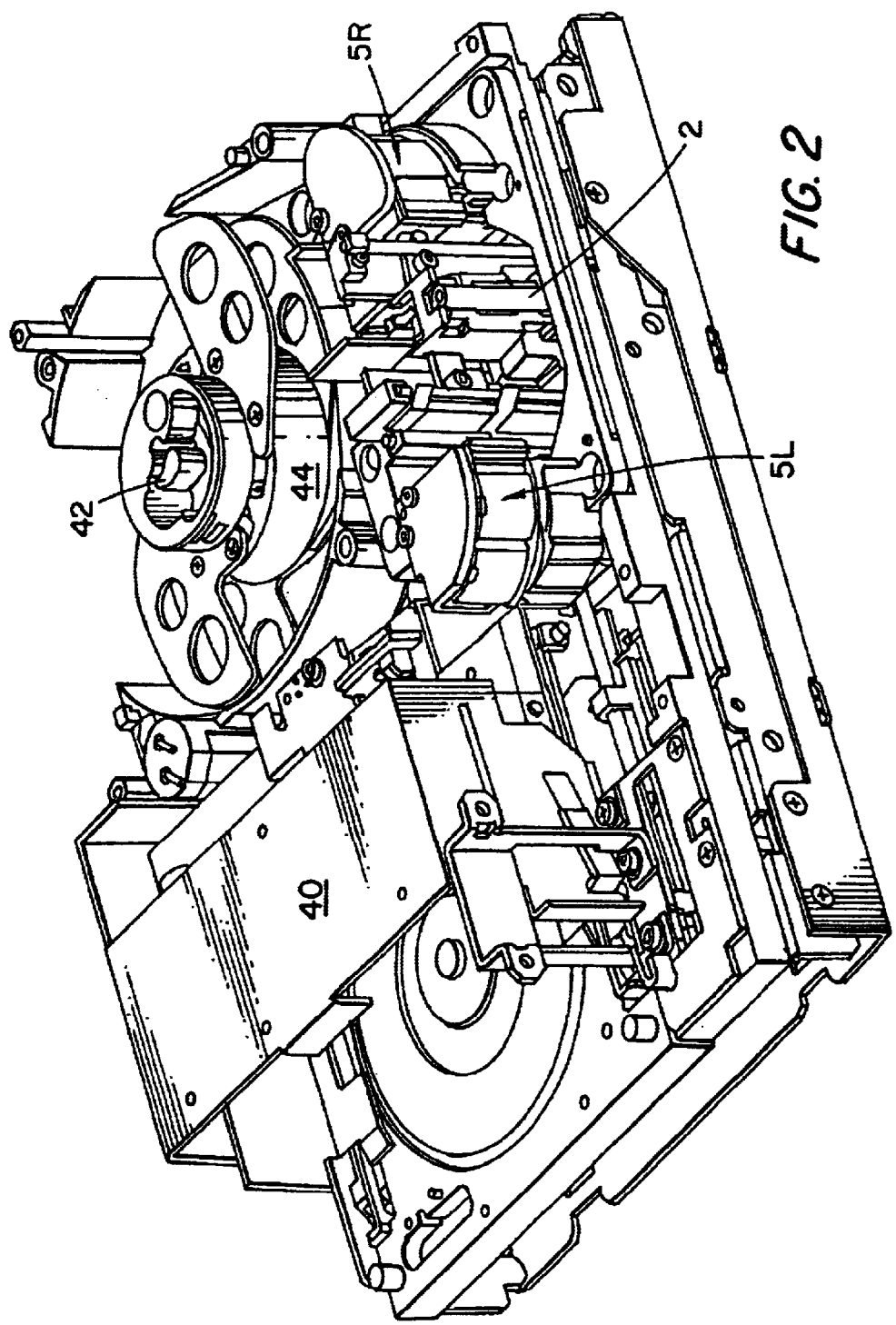
FIG. 2 is a perspective view showing an example of the internal constitution of a magnetic tape device in an aspect of the embodiment of the present invention.

FIG. 2 is a perspective view showing an example of the internal constitution of a magnetic tape device in an aspect of the embodiment of the present invention. A cartridge, which stores a wound magnetic tape, is inserted inside the device from the cartridge insertion slot 32A of FIG. 1. A loader 40 is provided in the recesses of the cartridge insertion slot 32A. The loader 40 sets an inserted cartridge in a prescribed position, and ejects an inserted cartridge from cartridge insertion slot 32A.

A hub 44 is disposed on a machine reel 42. Hub 44 has a door to which is mated a leader pin, which attaches to the end of the magnetic tape inside the cartridge, and is rotated and driven by a machine reel motor. Then, a threader (not shown in the figure) has a hook, which slides along a rail disposed thereon. The hook mates with the magnetic tape leader pin, draws this magnetic tape leader pin out, and causes same to mate with the door of the hub 44. In accordance with this hook, the magnetic tape is wrapped around the tape guide 5L, 5R, which are characteristic of the present invention, and thereafter, is latched to hub 44. A magnetic head 2 is positioned between the tape guides 5L, 5R, and performs read/write in relation to the magnetic tape.

Figure 3A:
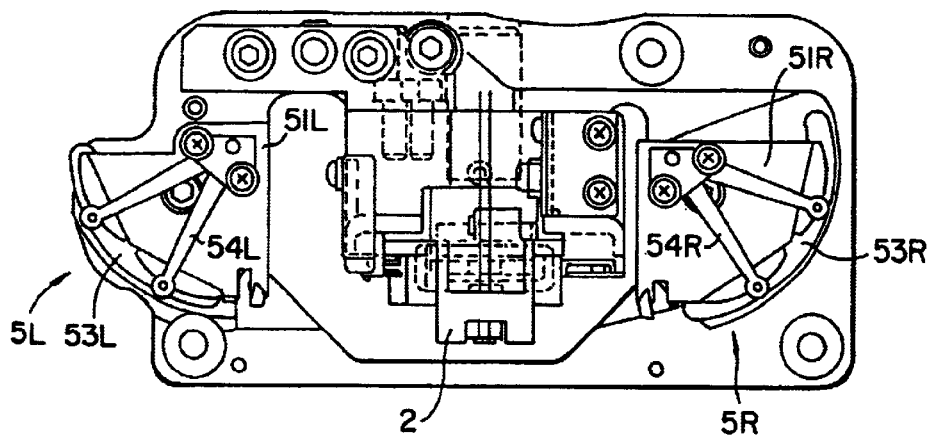
FIGS. 3A and 3B are diagrams illustrating the constitution of tape guide peripheral portions in an aspect of the embodiment of the present invention.
Figure 3B:
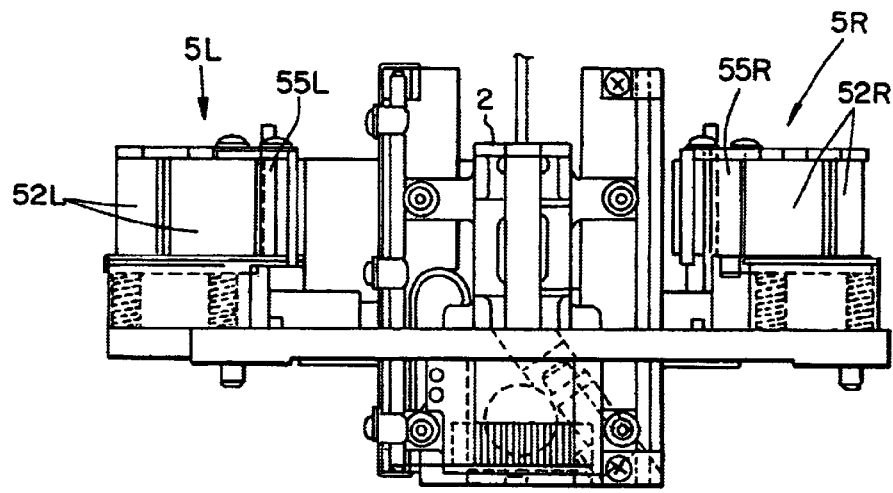

FIGS. 3A and 3B are diagrams illustrating the constitution of the peripheral portions of the tape guides in an aspect of the embodiment of the present invention. FIGS. 3A and 3B are a top view and side view, respectively, of tape guides 5L, 5R and magnetic head 2 arranged therebetween. As shown in FIG. 3A, tape guides 5L, 5R differ from the cylindrical shape of the past, and, as a whole, are fan shaped. Tape guides 5L, 5R comprise blocks 51L, 51R, which are each screwed to the base, a plurality of hydrobearings 52L, 52R, which form the magnetic tape guide surfaces, lower flanges 53L, 53R, which have surfaces that constitute the references of the magnetic tape travel position, and flat springs 54L, 54R, which bias a magnetic tape to the lower flanges 53L, 53R. Further, as shown in FIG. 3B, spacers 55L, 55R are arranged in the gaps between flat springs 54L, 54R and blocks 51L, 51R.

FIGS. 4A, 4B, 4C and 4D are a top view, a front view seen from the direction of arrow X thereof, a side view seen from the direction of arrow Y, and a bottom view of the block 51L and the hydrobearing 52L bonded thereto respectively, and FIGS. 5A, 5B, 5C and 5D are a top view, a front view seen from the direction of arrow X thereof, a side view seen from the direction of arrow Y, and a bottom view of the block 51R and the hydrobearing 52R bonded thereto, respectively. In each of FIGS. 4A–4D and FIGS. 5A–5D, the hydrobearings 52L, 52R are formed, for example, from ceramics, which have good relative surface roughness, and have circular arc surfaces c1. Consequently, the guide surfaces of tape guides 5L, 5R have a plurality of circular arc surfaces c1. Because hydrobearings 52L, 52R are bonded so as to abut on circular arc c2 of radius r2 (refer to FIG. 4D and FIG. 5A), which is larger than radius r1 of circular arc surface c1 thereof, a magnetic tape travels along circular arc surface c2 of radius r2 in accordance with a guide surface formed by hydrobearing 52L, 52R. In FIGS. 4A–4D and FIGS. 5A–5D, the radius r1 of circular arc c1 is, for example, 12 mm, and radius r2 of circular arc c2 is depicted, for example, as 21.01 mm. In this manner, by forming the guide surface of a magnetic tape, which travels along circular arc surface c2 of radius r2, not with one circular arc surface c2 of radius r2, but with a plurality of smaller therethan circular arc surfaces c1 of radius r1, it is possible to decrease the contact surface area of a magnetic tape and the guide surfaces of tape guides 5L, 5R. Making the contact surface area smaller prevents the magnetic tape from sticking.

Furthermore, the upper surface of blocks 51L, 51R has flat spring fastening screw holes 511, a block fastening screw hole 512 and a block positioning reference hole 513. Further, comparing FIG. 4 and FIG. 5, the difference in the shapes of blocks 51L and 51R is the result of different mounting positions relative to the magnetic tape device, and is not a substantial difference.

FIGS. 6A and 6B are a top view and a side view as seen from the direction of arrow Z of flat springs 54L, respectively, and FIGS. 7A and 7B are a top view and a side view, respectively, as seen from the direction of arrow Z of flat springs 54B. Flat springs 54L, 54R are magnetic tape biasing means used in place of the coil spring in a conventional roller guide, and the tip portions of flat springs 54L, 54R bias the edge of a magnetic tape in the width direction toward lower flanges 53L, 53R, which form the travel reference position. Flat springs 54L, 54R bias the widthdirection edge of a magnetic tape on each of the plurality of circular arc surfaces, which form the magnetic tape guide surface. By biasing a magnetic tape at a plurality of separate points, it is possible to achieve the same effect as a case in which a magnetic tape edge is biased along a prescribed length by a conventional coil spring.

In FIGS. 6A–6B and FIGS. 7A–7B, respectively, flat springs 54L, 54R have 2 elongated portions 54a corresponding to the number of hydrobearings 52L, 52R, and 2 protruding portions 54b disposed at each end of the opposite side of the common fixed end thereof. That is, 2 elongated portions 54a extend in a V shape from the fixed end thereof. The elongated portions 54a are formed, for example, from stainless steel, and on the fixed end thereof, there are disposed 2 screw mounting holes 543, and a positioning reference hole 544. The screw mounting holes 543 of flat springs 54L, 54R correspond to the flat spring fastening screw holes 511 of blocks 51L, 51R, and the positioning reference hole 544 of flat springs 54L, 54R corresponds to positioning reference hole 513 of blocks 51L, 51R. Furthermore, in FIGS. 6A–6B and FIGS. 7A–7B, the thickness of the elongated portions 54a is depicted, for example, as 0.12 mm.

Further, the protruding portions 54b shown in FIG. 6B and FIG. 7B are disposed at the end of each elongated portion 54a so as to make contact with the edge of a magnetic tape. The protruding portions 54b can either be integrally formed with the elongated portions 54a, or can be formed separately and then mounted at the ends of the elongated portions 54a. In a case in which the protruding portions 54b are formed separately, the protruding portions 54b are formed, for example, from ceramics.

The common fixed ends of the respective flat springs 54L, 54R are positioned relative to the above-mentioned blocks 51L, 51R by a common reference pin, and are fastened to blocks 51L, 51R in accordance with the screw mounting holes 543.

Flat springs 54L, 54R have a resonance frequency, which is determined by the material thereof, and oscillate in accordance with making contact with a magnetic tape and the vibration of the mechanism portion of the magnetic tape device. As a result thereof, there is the danger of vibrations being transferred from flat springs 54L, 54R to a magnetic tape, and adversely affecting tracking performance. In an aspect of the embodiment of the present invention, to curb the resonance of flat springs 54L, 54R, the elongated portions 54a preferably have a shape, which becomes narrower toward the tip from the fixed end. In accordance therewith, flat springs 54L, 54R do not have resonance frequencies between 200 Hz and 1,300 Hz, and are capable of performing biasing without subjecting a magnetic tape to vibrations. In the example depicted in FIGS. 6A–6B and FIGS. 7A–7B, the elongated portions 54a are 2.8 mm wide near the common fixed end thereof, and near the tips, have a width of 1.5 mm, which is narrower therethan.

The number of respective flat springs 54L, 54R is not limited to 2. For example, in a case in which 3 or more hydrobearings 52L, 52R are provided, flat springs 54L, 54R, which accord with the number thereof, are provided. Further, the fixed end need not be common to all flat springs 54L, 54R. Further, flat springs 54L, 54R can also have a constitution having 1 elongated portion 54a, which has a width that extends across a plurality of circular arc surfaces.

According to the above present invention, in a case in which hydrobearings are used in the tape guides of a magnetic tape device, the guide surface for guiding a magnetic tape is formed by a plurality of circular arc surfaces. In accordance therewith, the contact surface area of a magnetic tape and tape guide becomes smaller, making it possible to prevent the sticking of a magnetic tape to tape guide.

Further, by using flat springs in place of a coil spring, it is possible to bias a magnetic tape to a tape guide reference travel position without a tape guide having a cylindrical shape.

According to this constitution, because it is possible to replace the conventional coil spring, and to bias the widthdirection edge of a magnetic tape to a reference travel position, a magnetic tape does not slip out of place from the travel position, enabling a magnetic tape to travel stably.

The scope of protection of the present invention is not limited to the above-mentioned aspects of the embodiment, and extends to the inventions disclosed in the scope of the claims, and to the equivalents thereof.

What is claimed is:

1. A magnetic tape device, comprising:

a magnetic head for performing read/write operation to a magnetic tape traveling a tape travel path; and a pair of tape guides, each of which has a guide surface for guiding said magnetic tape along said tape travel path, and which are positioned respectively on the upstream side and downstream side of said magnetic head;

wherein the guide surface of each of said tape guides is formed by a plurality of circular arc surfaces;

wherein the tape travel path along said guide surface of each of said tape guides is a first arc of a first circle which is formed by portions of second and third arcs of second and third circles, respectively, and further wherein said second and third circles are each of a smaller radius than said first circle.

2. The magnetic tape device according to claim 1, wherein said tape guide has a flange for forming a reference travel position for one edge in the width direction of said magnetic tape, and a flat spring for biasing the other edge of said magnetic tape to said travel reference position.

3. The magnetic tape device according to claim 2, wherein said flat spring has an elongated portion having a prescribed length, and a protruding portion which is formed on an end that is opposite to a fixed end of the elongated portion, and said protruding portion comes in contact with said magnetic tape.

4. The magnetic tape device according to claim 3, wherein said elongated portion has a tapering shape toward from said fixed end to said opposite end.

5. The magnetic tape device according to claim 2, wherein one said flat spring is provided for each of said plurality of circular arc surfaces, such that each of said flat springs biases said magnetic tape on one of said circular arc surfaces.

6. A tape guide having a guide surface for guiding said magnetic tape which travels along a tape travel path inside a magnetic tape device for performing read/write operation to a magnetic tape, wherein said guide surface is formed by a plurality of circular arc surfaces, wherein the tape travel path along said guide surface of said tape guide is a first arc of a first circle which is formed by portions of second and third arcs of second and third circles, respectively, and further wherein said second and third circles are each of a smaller radius than said first circle.

* * * * *